United States Patent
Satish

(10) Patent No.: US 7,941,850 B1
(45) Date of Patent: May 10, 2011

(54) MALWARE REMOVAL SYSTEM AND METHOD

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1101 days.

(21) Appl. No.: 11/317,320

(22) Filed: Dec. 23, 2005

(51) Int. Cl.
*G06F 21/00* (2006.01)
(52) U.S. Cl. .............. 726/22; 726/23; 726/24; 726/25
(58) Field of Classification Search .............. 726/22, 726/23, 24, 25; 713/189–194
See application file for complete search history.

(56) References Cited

U.S. PATENT DOCUMENTS

| | | | |
|---|---|---|---|
| 7,103,915 B2 * | 9/2006 | Redlich et al. | 726/27 |
| 7,487,546 B1 * | 2/2009 | Szor | 726/25 |
| 7,506,374 B2 * | 3/2009 | Carmona | 726/24 |
| 2004/0117641 A1 * | 6/2004 | Kennedy et al. | 713/188 |

* cited by examiner

*Primary Examiner* — Vivek Srivastava
*Assistant Examiner* — Helai Salehi
(74) *Attorney, Agent, or Firm* — Gunnison, McKay & Hodgson, L.L.P.; Forrest Gunnison

(57) ABSTRACT

A method includes determining if an attempt to recreate a requested resource is made, and, if so, if the requested resource is a suspicious resource. If the requested resource is a suspicious resource, identification of an originating process is made. A determination is made if the originating process is a non-trusted originating process or a trusted originating process. If the originating process is the non-trusted originating process, a protective action is taken. In this manner, self-repairing and persistent malicious code is identified and removed with minimal adverse impact on system functionality.

17 Claims, 4 Drawing Sheets

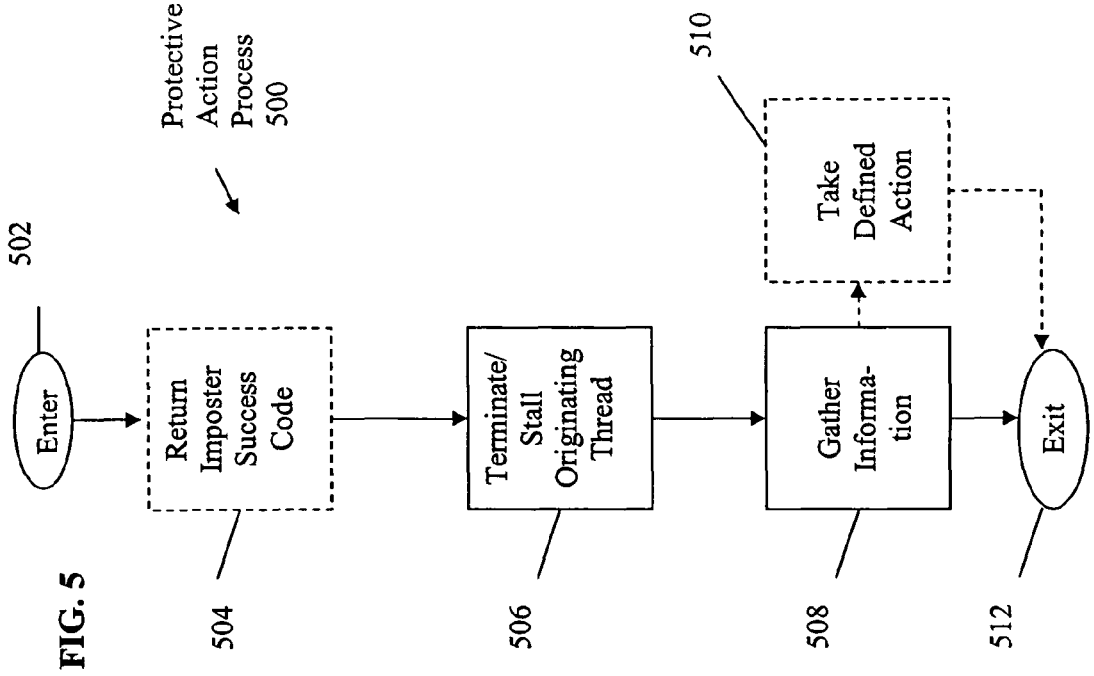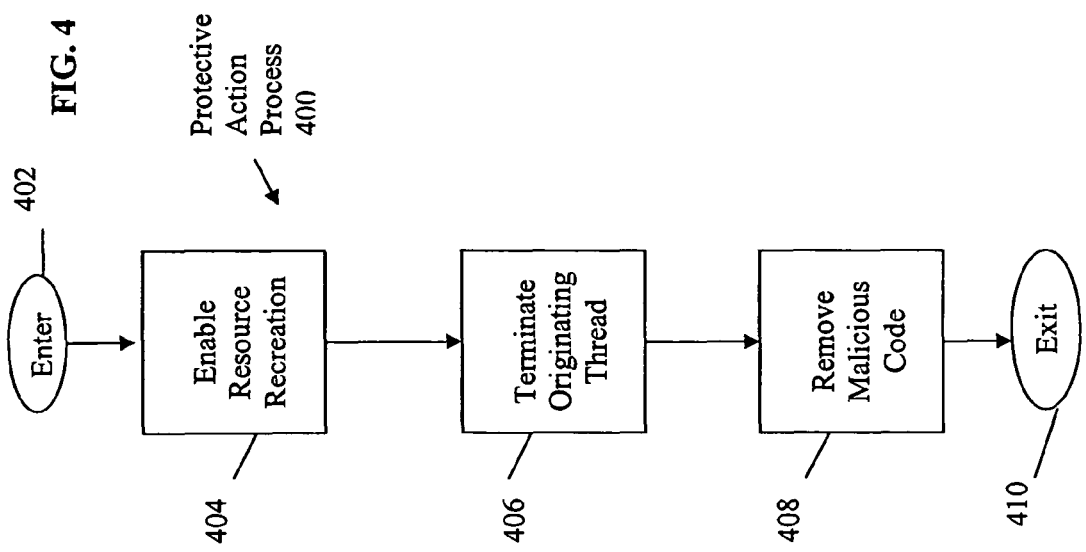

MALWARE REMOVAL SYSTEM AND METHOD

BACKGROUND OF THE INVENTION

1. Field of the Invention

The present invention relates to the protection of computer systems. More particularly, the present invention relates to a system and method of identifying and removing malicious software.

2. Description of the Related Art

Malicious software, sometimes called malware or malicious code, invades computer systems and causes harmful or annoying consequences. Malicious code typically includes any program or file that is harmful to a computer system or unwanted by a computer user, e.g., computer viruses, worms, Trojan horses, spyware, adware, and software code that gathers information about a computer user without authorization of the user or system administrator.

Once malicious code gains access to a computer system, it takes various actions resulting in a variety of undesirable results. For example, malicious code corrupts application software code, resulting in abnormal termination of the application. Malicious code corrupts operating system software code causing abnormal system hangs.

Removal of malicious code has undesirable consequences. For example, malicious code associates itself with a valid process executing on a computer system. Attempts to eliminate the malicious code result in an abnormal termination of the valid process and software program failure.

Further, complete and permanent removal of malicious code proves difficult. For example, malicious code stores a copy of itself in memory. Upon termination or removal of malicious code components, the stored copy of the malicious code restores and/or recreates the removed malicious code components.

SUMMARY OF THE INVENTION

In accordance with one embodiment of the present invention, a method includes determining if an attempt to recreate a requested resource via a recreation request is made.

If an attempt to recreate a requested resource is made, a determination is made if the requested resource is a suspicious resource, i.e., associated with malicious code.

If the requested resource is determined to be the suspicious resource, an originating process of the attempt is identified. The originating process is assessed, and a determination is made whether the originating process is a non-trusted originating process or a trusted originating process.

If the originating process is determined to be the non-trusted originating process, a protective action is taken.

Embodiments in accordance with the present invention are best understood by reference to the following detailed description when read in conjunction with the accompanying drawings.

BRIEF DESCRIPTION OF THE DRAWING

FIG. 4 is a flow diagram of another protective action process of the TAKE PROTECTIVE ACTION OPERATION of the malicious code removal process of FIG. 2 in accordance with one embodiment of the present invention; and FIG. 5 is a flow diagram of yet another protective action process of the TAKE PROTECTIVE ACTION OPERATION of the malicious code removal process of FIG. 2 in accordance with one embodiment of the present invention.

Common reference numerals are used throughout the drawings and detailed description to indicate like elements.

DETAILED DESCRIPTION

Figure 1:
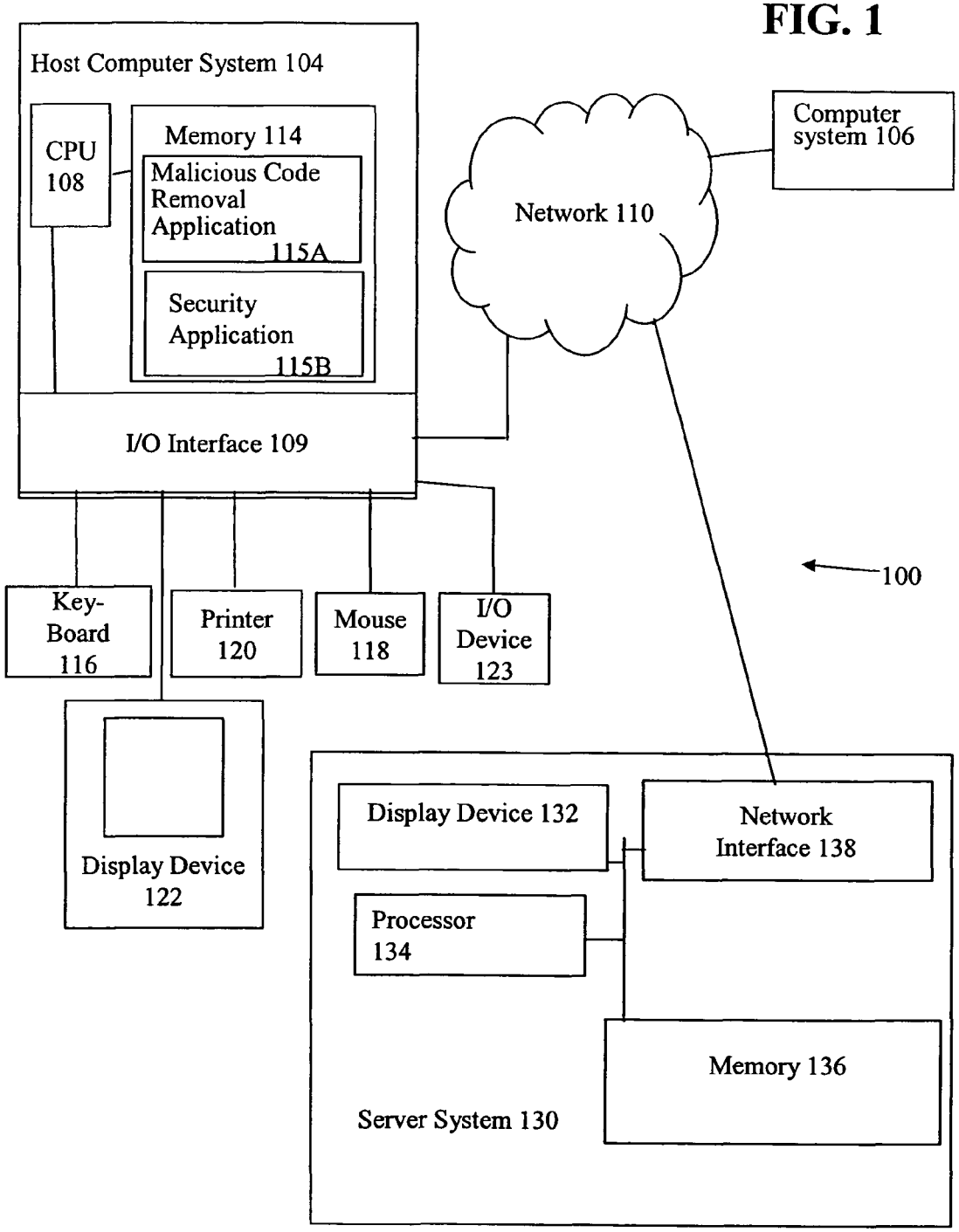
FIG. 1 is a diagram of a client-server system that includes a malicious code removal application executing on a host computer system in accordance with one embodiment of the present invention.

Embodiments of the present invention provide a system and method for identification and removal of malicious code. Herein, in one embodiment, malicious code is defined as any computer program, module, set of modules, or code that enters a computer system environment without an authorized user's knowledge and/or without an authorized user's consent. A computer virus is one example of malicious code. In one embodiment, malicious code includes a malicious process and a watchdog, as well as any resource used by or associated with the malicious code, e.g., files and processes.

The malicious process embodies a set of computer instructions that carries out the intended harm or unwanted action. For example, the malicious process executes on a host computer system and repeatedly spawns popup advertisements.

The watchdog embodies a set of computer instructions that monitor the malicious code. For example, the watchdog executes on a host computer system and monitors malicious code, e.g., a malicious process. The watchdog also monitors computer system resources, sometimes called "resources", used by or associated with the malicious code. Examples of resources are files, operating system or application processes, and various areas of memory. For example, the watchdog monitors a file used by the malicious process.

The watchdog attempts to create or recreate malicious code components and resources. For example, security code removes a malicious process and a file used by the malicious process. The watchdog discovers the removal and attempts to restore the malicious process and to create or recreate the file.

For purposes of simplicity, the terms "create" and "recreate" are used interchangeably, as are "creation" and "recreation", to indicate creation of a resource, whether or not the resource presently exists or previously existed.

To attempted recreation of the malicious code components, the watchdog calls an operating system function such as a resource creation function associated with the operating system, sometimes called a "creation function" or "creation process".

One example of a creation function is an operating system module that facilitates execution of a process or subprocess in memory, e.g., the "exec" command associated with various operating systems.

Another example of a creation function is a CreateFile function associated with various versions of the Windows® operating system. For example, the CreateFile function creates or opens resources such as a file and returns a handle that can be used to access the created file.

Security code, referenced in the foregoing illustration, is any computer program, module, set of modules, or code used to protect a computer system from malicious code. For example, security code includes a security process executing in memory and security application 115B. In one example of protecting a computer system from malicious code, security code uses a removal script to delete registry entries associated with the malicious code, to remove a malicious process, and to perform other security-related actions.

In certain types of malicious code, the watchdog and the malicious process are reciprocating processes, i.e., each process functions both as a malicious process and as a watchdog on behalf of the other process.

Therefore, the malicious process and the watchdog are sometimes referred to as a "first malicious process" and as a "second malicious process", respectively. Alternatively, the malicious process and the watchdog are sometimes referred to as the "second malicious process" and as the "first malicious process", respectively.

For example, if security application 115B removes the watchdog/first malicious process executing on a host computer system, a second malicious process executing on the same host computer system and carrying out destructive activities also restores or recreates the terminated watchdog/first malicious process.

Figure 2:
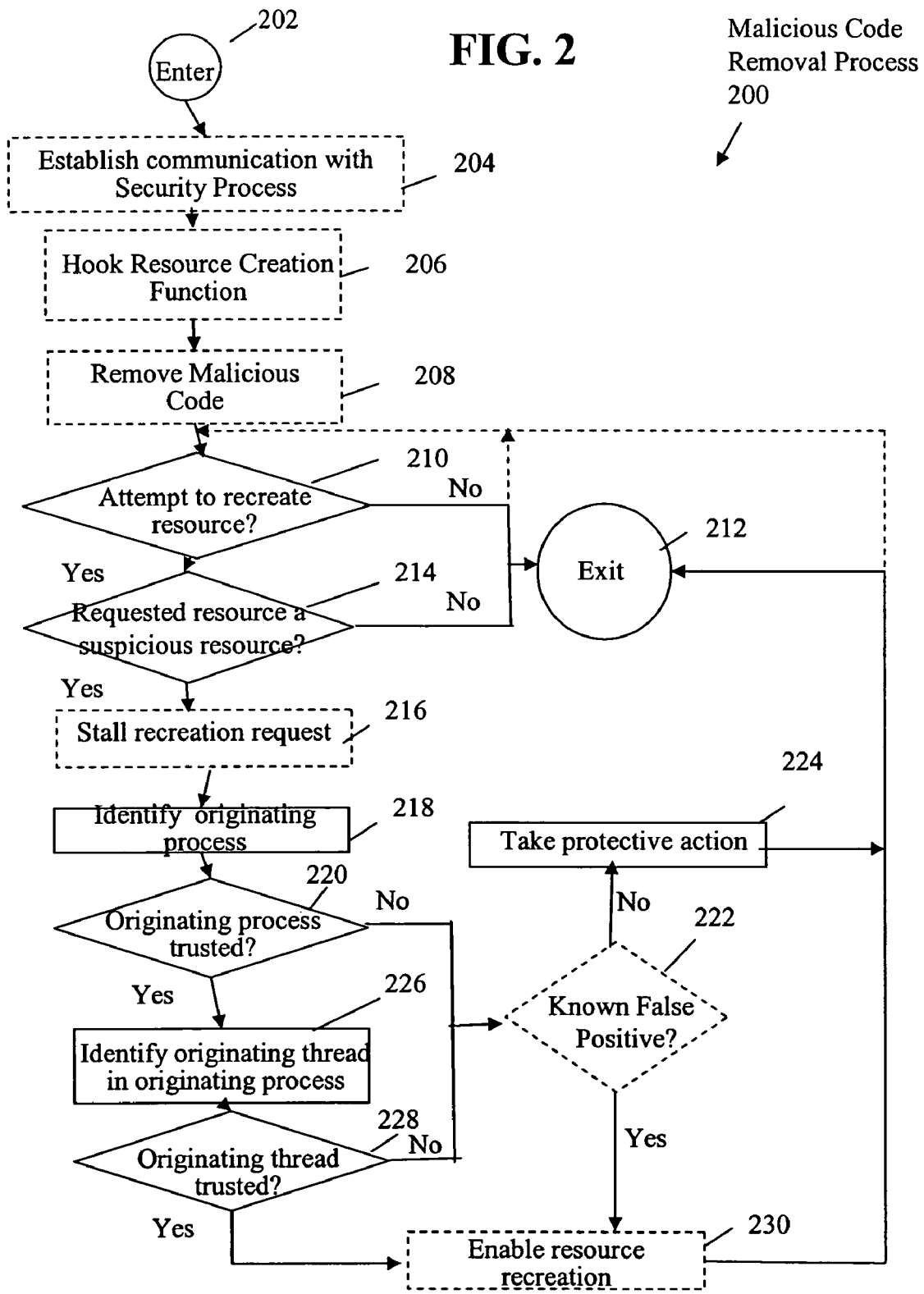
FIG. 2 is a flow diagram of a malicious code removal process in accordance with one embodiment of the present invention.

Referring now to FIG. 2, a method includes determining if an attempt to recreate a requested resource is made in an ATTEMPT TO RECREATE RESOURCE CHECK OPERATION 210. If it is determined that an attempt to recreate a requested resource is made, a determination is made whether the resource to be recreated is a suspicious resource in a REQUESTED RESOURCE A SUSPICIOUS RESOURCE CHECK OPERATION 214.

If the requested resource is determined to be a suspicious resource, an originating process of the attempt to recreate the resource is identified in an IDENTIFY ORIGINATING PROCESS OPERATION 218 and the originating process is determined to be trusted or non-trusted in an ORIGINATING PROCESS TRUSTED CHECK OPERATION 220.

If the originating process is non-trusted, a protective action is taken in a TAKE PROTECTIVE ACTION OPERATION 224.

If the originating process is trusted, an originating thread that originated the attempt to recreate the resource is identified in an IDENTIFY ORIGINATING THREAD IN ORIGINATING PROCESS OPERATION 226 and the originating thread is determined to be trusted or non-trusted in an ORIGINATING THREAD TRUSTED CHECK OPERATION 228.

If the originating thread is determined to be non-trusted, a protective action is taken in TAKE PROTECTIVE ACTION OPERATION 224.

In this manner, malicious code components are identified and defeated.

More particularly, FIG. 1 is a diagram of a computer system or computer network 100 that includes a host computer system 104, e.g., a first computer system, which includes a malicious code removal application 115A and a security application 115B, in accordance with one embodiment of the present invention.

Host computer system 104, sometimes called a client or user device, typically includes a central processing unit (CPU) 108, sometimes called a processor 108, an input/output (I/O) interface 109, and a memory 114. Host computer system 104 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform port for inputting data to and outputting data from host computer system 104. In one embodiment, malicious code removal application 115A is loaded into host computer system 104 via I/O device 123, such as from a CD, DVD or floppy disk containing malicious code removal application 115A.

Host computer system 104 is coupled to a server system 130 of computer system 100, e.g., client-server computer system, by a network 110. Server system 130 typically includes a display device 132, a processor 134, a memory 136, and a network interface 138. Additional computer systems such as computer system 106, e.g., a second computer system, are also associated with the network 110.

Network 110 can be any network or network system that is of interest to a user. In various embodiments, network interface 138 and I/O interface 109 include analog modems, digital modems, or a network interface card.

Malicious code removal application 115A is stored in memory 114 of host computer system 104 and executed on host computer system 104. The particular type of and configuration of host computer system 104, server system 130, and computer system 106 are not essential to this embodiment of the present invention.

FIG. 2 is a flow diagram of a malicious code removal process 200 in accordance with one embodiment of the present invention. Referring now to FIGS. 1 and 2 together, execution of malicious code removal application 115A by CPU 108 results in the operations of malicious code removal process 200 as described below in one embodiment.

From an ENTER OPERATION 202, flow moves to an optional ESTABLISH COMMUNICATION WITH SECURITY PROCESS OPERATION 204. In ESTABLISH COMMUNICATION WITH SECURITY PROCESS OPERATION 204, communication is established with a security program or security process, e.g., security application 115B. Such communication permits the security application to provide information to, or make information accessible to, malicious code removal application 115A. In this manner, the security application and malicious code removal application 115A cooperate to permit information accessibility relevant to detecting and defeating malicious code, as discussed more fully below.

The particular implementation and structure of security application 115B and malicious code removal application 115A relative to one another is not essential to this embodiment so long as communication functionality is enabled. For example, as discussed below, in various embodiments, security application 115B and malicious code removal application 115A are implemented: (1) as integrated or independent modules, e.g., kernel mode modules; or (2) as independent applications, e.g., one application is configured to communicate with the other.

In one embodiment, security application 115B, malicious code removal application 115A, or both are implemented as kernel mode modules and are able to generate, receive, or exchange information at the kernel level of operation. The kernel mode modules may be integrated with or independent of one another.

To illustrate, security application 115B and malicious code removal application 115A are kernel mode modules. Security application 115B detects and removes malicious code. As a kernel mode module, malicious code removal application 115A receives information pertinent to the removed malicious code.

In one example, security application 115B terminates and removes malicious code, including a malicious process named "MaliciousProcess", and a file named "MaliciousFile" used by MaliciousProcess. Upon removal of MaliciousProcess and MaliciousFile, security application 115B gathers the names of the terminated/removed components. The names are communicated to malicious code removal application 115A.

In another embodiment, security application 115B is independent of malicious code removal application 115A, and is configured to communicate with malicious code removal application 115A using any one of a number of techniques well known to those of skill in the art. The particular technique used is not essential to this embodiment of the present invention. Upon invocation or execution of security application 115B, information gathered by security application 115B, such as that exemplified above, is communicated to malicious code removal application 115A.

In another embodiment, security application 115B generates a list of resources associated with the terminated and removed malicious code components. For example, security application 115B writes the names of the removed components, e.g., MaliciousProcess and MaliciousFile, to a file accessible by malicious code removal application 115A.

From ESTABLISH COMMUNICATION WITH SECURITY PROCESS OPERATION 204 (or, alternately, from ENTER OPERATION 202) flow moves to an optional HOOK RESOURCE CREATION FUNCTION OPERATION 206. In HOOK RESOURCE CREATION FUNCTION OPERATION 206, at least one operating system function of host computer system 104, e.g., a creation function, is hooked to facilitate interception of invocation of, e.g., calls to, the operating system function. In this manner, malicious code removal application 115A is able to monitor attempts to recreate resources, some of which may be associated with malicious code, as discussed more fully below.

In one embodiment, an operating system function is hooked by inserting a jump instruction directly into the operating system function. For example, the CreateFile function is hooked through insertion of a jump instruction.

As is well known to those of skill in the art, a system service table, sometimes called a dispatch table or a system call table, relates system calls to specific addresses within an operating system kernel. In one embodiment, a hooked system service table redirects creation function calls. For example, the hooked system service table redirects the creation function call to a module of malicious code removal application 115A executing in memory instead of directing the creation function call to the creation function of the operating system.

The function call, or call, to the creation function is sometimes called a "recreation request". The recreation request is made by a call module of a computer program or process, sometimes called an "originating process". In accordance with one embodiment of the present invention, the originating process includes operating system function call instruction(s), i.e., the instruction or set of instructions that originates the operating system function call.

In one embodiment, the call module is the originating process. The originating process may be malicious, i.e., a component of, or associated, with malicious code. The originating process may be non-malicious, i.e., not a component of, or associated with, malicious code.

In one embodiment, the call module is a thread, i.e., a task or subprocess of the originating process. The thread is sometimes called an "originating thread". The originating thread may be malicious, i.e., a component of, or associated with, malicious code. The originating thread may be non-malicious, i.e., not a component of, or associated with, malicious code. In one embodiment, the call module is an injected thread, i.e., a malicious originating thread inserted by malicious code into a non-malicious originating process.

The resource requested to be created or recreated in a recreation request is sometimes called a "requested resource". In one embodiment, interception of recreation requests is limited to recreation requests for recreation of types of resources which are generally associated with, used by, or components of malicious code, e.g., files.

To continue with the foregoing illustration, an originating process executing on host computer system 104 calls the CreateFile function hooked in HOOK RESOURCE CREATION FUNCTION OPERATION 206. The originating process waits for the CreateFile function to return an indication of successful recreation of the requested resource.

Although various examples of hooking a function, process, or system are described above, in light of this disclosure, those of skill in the art will understand that other techniques can be used.

Further, in accordance with various embodiments of the present invention, the creation function remains unhooked, i.e., not hooked. Rather, malicious code removal application 115A receives the previously described information pertaining to recreation requests via various means, e.g., variables or passed parameters.

It is noted that the foregoing operations ESTABLISH COMMUNICATION WITH SECURITY PROCESS OPERATION 204 and HOOK RESOURCE CREATION FUNCTION OPERATION 206 are optional and as such, the functionality of each may be inherent to a particular computer processing environment or computer system. For example, operating system modules and application programs resident on the computer system provide information relevant to terminated and removed malicious code. For this or other reasons, one or both of operations 204, 206 are not included in various embodiments of the present invention and so are optional.

From HOOK RESOURCE CREATION FUNCTION OPERATION 206 (or from either ENTER OPERATION 202 or ESTABLISH COMMUNICATION WITH SECURITY PROCESS OPERATION 204), flow moves to an optional REMOVE MALICIOUS CODE OPERATION 208. In REMOVE MALICIOUS CODE OPERATION 208, malicious code is removed and information related to removal of the malicious code is made available to malicious code removal application 115A. In this manner, the removal of malicious code and resources associated with malicious code is monitored.

In one embodiment, the malicious code is removed by security application 115B, which also gathers information and makes it available to malicious code removal application 115A, as discussed in reference to ESTABLISH COMMUNICATION WITH SECURITY PROCESS OPERATION 204.

The information made available to malicious code removal application 115A relates to the malicious code, the actions of removing the malicious code, the results of removing the malicious code, and/or information about resources used by or associated with removed malicious code. For example, the information includes termination times of the terminated processes, filenames of removed files, file locations of removed files, file creation times of removed files, and file deletion times of removed files.

To continue with the foregoing illustration, hooked security application 115B executing on host system 104 detects and removes the malicious process, MaliciousProcess and the file, MaliciousFile. Security application 115B provides the times MaliciousProcess and MaliciousFile were removed and provides the process name "MaliciousProcess" and the filename "MaliciousFile" to malicious code removal application 115A.

Flow moves from REMOVE MALICIOUS CODE OPERATION 208 (or, alternately, from ENTER OPERATION 202, ESTABLISH COMMUNICATION WITH SECURITY PROCESS OPERATION 204, or HOOK RESOURCE CREATION FUNCTION OPERATION 206) to an ATTEMPT TO RECREATE RESOURCE CHECK OPERATION 210. In ATTEMPT TO RECREATE RESOURCE CHECK OPERATION 210, a determination is made whether an attempt to create or recreate a requested resource, i.e., a computer system resource, has occurred. For example, receipt of a redirected recreation request by malicious code removal application 115A from the hooked creation function indicates such an attempt.

If no attempt to create or recreate a requested resource is made, flow exits in an EXIT OPERATION 212 or flow returns to ATTEMPT TO RECREATE RESOURCE CHECK OPERATION 210.

If an attempt to recreate a requested resource is made, as determined in ATTEMPT TO RECREATE RESOURCE CHECK OPERATION 210, flow moves to a REQUESTED RESOURCE A SUSPICIOUS RESOURCE CHECK OPERATION 214. In REQUESTED RESOURCE A SUSPICIOUS RESOURCE CHECK OPERATION 214, a determination is made as to whether the requested resource is a suspicious resource. If it is determined that the requested resource is a suspicious resource, recreation of the requested resource may have been made by a watchdog, thus warranting further investigation to identify such malicious code, if it exists.

The determination about whether the requested resource is a suspicious resource is made, for example, by comparing information about the removed malicious code, e.g., information received in REMOVE MALICIOUS CODE OPERATION 208, to information associated with the recreation request.

Based on the comparison, the requested resource is determined to be: (1) a suspicious resource, i.e., a resource likely to be associated with malicious code; or (2) a legitimate resource, i.e., a resource unlikely to be associated with malicious code.

To continue with the foregoing illustration, a comparison is made between the filename "MaliciousFile" received from security application 115B and the filename "MaliciousFile" received from the hooked CreateFile function. The filenames match. Further, a comparison is made between the time the recreation request was received from the hooked CreateFile function and the time MaliciousFile was removed. The recreation request was received just after the time MaliciousFile was removed. The matching filenames together with the close timing of the removal and the recreation request lead to a determination that the requested resource is a suspicious resource.

If a determination is made that the requested resource is a legitimate resource in REQUESTED RESOURCE A SUSPICIOUS RESOURCE CHECK OPERATION 214, flow exits in EXIT OPERATION 212. Alternately, flow returns to ATTEMPT TO RECREATE RESOURCE CHECK OPERATION 210 until another attempt to recreate a requested resource is made.

On the other hand, if a determination is made in REQUESTED RESOURCE A SUSPICIOUS RESOURCE CHECK OPERATION 214 that a requested resource is a suspicious resource, flow moves to an optional STALL RECREATION REQUEST OPERATON 216. In STALL RECREATION REQUEST OPERATON 216, the recreation request is stalled, i.e., is prevented from reaching the operating system. By stalling the recreation request, recreation of the requested resource is stalled.

From STALL RECREATION REQUEST OPERATION 216, flow moves to an IDENTIFY ORIGINATING PROCESS OPERATION 218. In IDENTIFY ORIGINATING PROCESS OPERATION 218, malicious code removal application 115A identifies an originating process of the recreation request. In this manner, the originating process can be investigated to determine association of the originating process with malicious code, if any.

An originating process is a function, process, module or other software component that attempts to invoke the creation function, as previously described. For example, in one embodiment, the originating process is the process that called the CreateFile function.

The originating process may be identified by various techniques, including any technique used to identify a calling process. For example, the callback to the originating process is traced. In another example, the process context of the call for resource recreation is queried. One skilled in the art will recognize that such techniques are well known in the art and, therefore, require no further elaboration.

Once the originating process has been identified in IDENTIFY ORIGINATING PROCESS OPERATION 218, flow moves to ORIGINATING PROCESS TRUSTED CHECK OPERATION 220. In ORIGINATING PROCESS TRUSTED CHECK OPERATION 220, a determination is made if the originating process is a trusted originating process or a non-trusted originating process. In this manner, malicious code removal application 115A further assesses the likelihood that the originating process is malicious or non-malicious.

A trusted originating process is generally defined as a trusted process. In one embodiment, an administrator defines, configures, and/or sanctions which processes are trusted.

Conversely, a non-trusted originating process typically refers to any process other than a trusted originating process. A non-trusted originating process is typically malicious code and thus represents a good candidate for outright termination.

A determination of trusted originating process versus non-trusted origination process can be made via a variety of techniques. For example, malicious code removal application 115A compares an originating process with a list of known trusted originating processes, e.g., configured by the administrator.

If the originating process matches an entry in the list of known trusted originating processes, malicious code removal application 115A determines that the originating process is a trusted originating process.

If the originating process does not match any of the entries in the list of known trusted originating processes, malicious code removal application 115A determines that the originating process is a non-trusted originating process.

Other factors used in determining if the originating process is non-trusted may be used. For example, an administrator selects a set of criteria that indicates non-trustworthiness. In one embodiment, the set includes: (1) the originating process is a new process; (2) a file age of a file associated with the originating process is not within a predefined acceptable range of file ages for the originating process; (3) the originating process was created close in time to issuance of the recreation request; (4) a parent process of the originating process is malicious code; and/or (5) the originating process is executing from a folder.

One skilled in the art will recognize that various criteria are selected in determining if the originating process is trusted or non-trusted.

If the originating process is determined to be a non-trusted originating process in ORIGINATING PROCESS TRUSTED CHECK OPERATION 220, flow moves to an optional KNOWN FALSE POSITIVE CHECK OPERATION 222. In KNOWN FALSE POSITIVE CHECK OPERATION 222, a determination is made as to whether the non-trusted originating process is a known false positive module.

In one embodiment, a known false positive module is a program, module, set of modules, or code that is determined to be non-trusted, but that is, in fact, safe, i.e., does not contain malicious code.

If the non-trusted originating process is determined to be a known false positive module in KNOWN FALSE POSITIVE CHECK OPERATION 222, flow moves to an optional ENABLE RESOURCE RECREATION OPERATION 230. In ENABLE RESOURCE RECREATION OPERATION 230, the stalled recreation request is allowed to proceed. More particularly, the recreation request is passed to the operating system. As discussed above, the recreation request was stalled in STALL RECREATION REQUEST OPERATION 216. In this manner, the recreation request can be completed and the requested resource recreated.

From ENABLE RESOURCE RECREATION OPERATION 230, flow exits in an EXIT OPERATION 212 or, alternatively, flow moves to ATTEMPT TO RECREATE RESOURCE CHECK OPERATION 210.

If a determination is made that the non-trusted originating process is not a known false positive module in KNOWN FALSE POSITIVE CHECK OPERATION 222, flow moves from KNOWN FALSE POSITIVE CHECK OPERATION 222 (or from either ORIGINATING PROCESS TRUSTED CHECK OPERATION 220 or an ORIGINATING THREAD TRUSTED CHECK OPERATION 228, discussed below) to a TAKE PROTECTIVE ACTION OPERATION 224. In TAKE PROTECTIVE ACTION OPERATION 224, protective action is taken to protect the computer system from malicious code, e.g., the non-trusted originating process.

Protective action includes a plurality of actions which may be taken alone or in various combinations. Actions, for example, are situation-specific, software-specific, based on defined parameters, or determined by other means.

Figure 3:
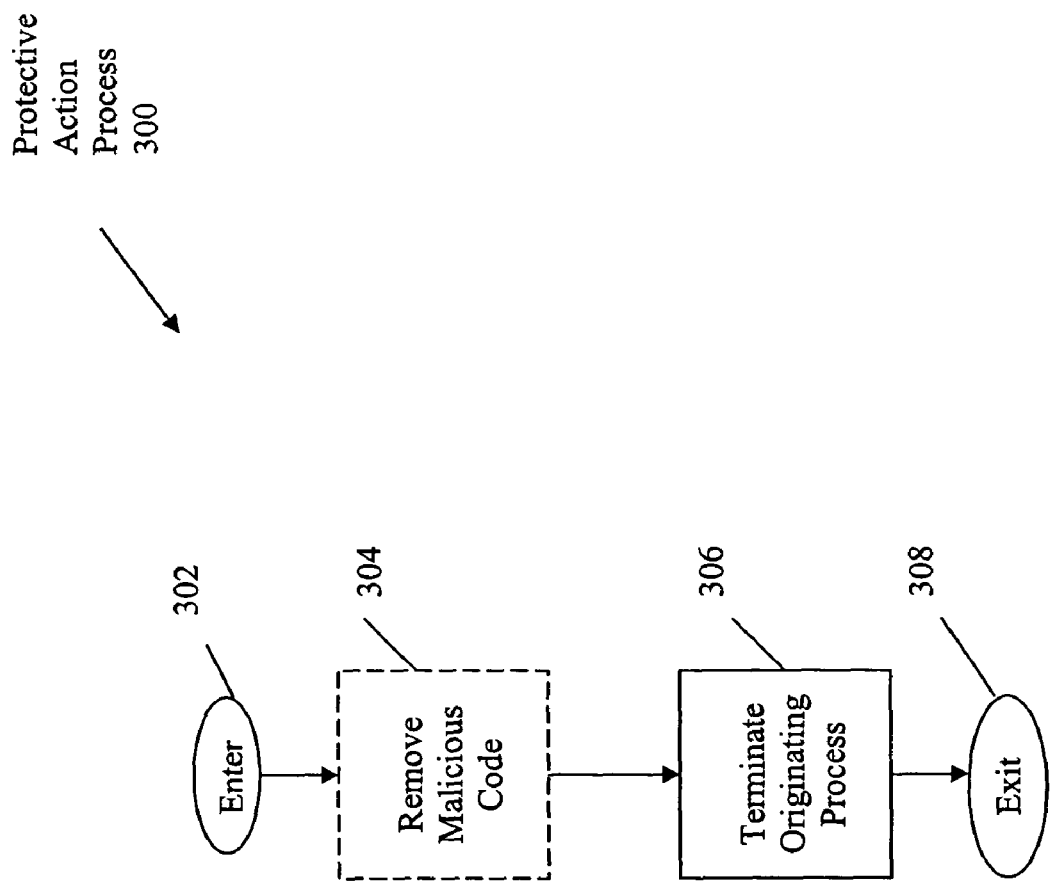
FIG. 3 is a flow diagram of a protective action process of a TAKE PROTECTIVE ACTION OPERATION of the malicious code removal process of FIG. 2 in accordance with one embodiment of the present invention.

With reference to FIG. 3, a flow diagram of one example of a protective action, i.e., protective action process 300 of TAKE PROTECTIVE ACTION OPERATION 224 of FIG. 2 in accordance with one embodiment of the present invention, is shown.

After entering protective action process 300 via an ENTER OPERATION 302 (and from KNOWN FALSE POSITIVE CHECK OPERATION 222, ORIGINATING PROCESS TRUSTED CHECK OPERATION 220, or ORIGINATING THREAD TRUSTED CHECK OPERATION 228, for example) flow moves to an optional REMOVE MALICIOUS CODE OPERATION 304. In REMOVE MALICIOUS CODE OPERATION 304, malicious code, or computer components determined to be malicious, are removed.

To illustrate, if optional STALL RECREATION REQUEST OPERATION 216 is not performed, and the requested resources have been recreated, security code is invoked or reinvoked and removes the recreated resources. For example, requested resources include MaliciousProcess and MaliciousFile, both of which are recreated by the operating system. Security application 115B is invoked, terminates the recreated MaliciousProcess, and deletes the MaliciousFile. As one skilled in the art will recognize, malicious code removal techniques vary.

From optional REMOVE MALICIOUS CODE OPERATION 304 (or from ENTER OPERATION 302), flow moves to a TERMINATE ORIGINATING PROCESS OPERATION 306. In TERMINATE ORIGINATING PROCESS OPERATION 306, the non-trusted originating process is terminated. In this manner, if the non-trusted originating process is the watchdog, it is defeated.

In another embodiment, TERMINATE ORIGINATING PROCESS OPERATION 306 is performed before or simultaneously with REMOVE MALICIOUS CODE OPERATION 304.

From TERMINATE ORIGINATING PROCESS OPERATION 306, flow exits in an EXIT OPERATION 308. Thereafter, flow either exits in EXIT OPERATION 212 or flow returns to ATTEMPT TO RECREATE RESOURCE CHECK OPERATION 210 of malicious code removal process 200.

With reference to FIG. 2, if the originating process is determined to be a trusted originating process, flow moves from ORIGINATING PROCESS TRUSTED CHECK OPERATION 220 to an IDENTIFY ORIGINATING THREAD IN ORIGINATING PROCESS OPERATION 226.

As previously discussed, a trusted originating process typically represents a process or program intended, by the administrator, for use on the computer system, and is not likely to be malicious code. Therefore, the recreation request issued by a trusted originating process could be a call for recreation of a legitimate resource.

Nevertheless, a trusted originating process is still subject to infiltration by malicious code, e.g., an injected malicious originating thread. If a trusted originating process is injected with a malicious originating thread, and the malicious originating thread issues a recreation request, the requested resource is likely to be a suspicious resource.

For example, malicious code injects the trusted originating process with a watchdog, which attempts to recreate MaliciousFile after removal of MaliciousFile by security application 115B.

Outright termination of a trusted originating process typically results in adverse consequences, e.g., abnormal termination of a user application. Therefore, further investigation of the trusted originating process is warranted to determine if malicious code has invaded the trusted originating process.

In IDENTIFY ORIGINATING THREAD IN ORIGINATING PROCESS OPERATION 226, an originating thread is identified in the trusted originating process. An originating thread is any thread of the originating process that initiated the recreation request, as previously discussed. The originating thread may be identified by known methods in the art, e.g., tracing the thread. In this manner, the originating thread can be investigated to determine association of the originating thread with malicious code, if any.

From IDENTIFY ORIGINATING THREAD IN ORIGINATING PROCESS OPERATION 226, flow moves to ORIGINATING THREAD TRUSTED CHECK OPERATION 228. In ORIGINATING THREAD TRUSTED CHECK OPERATION 228, a determination is made if the originating thread is a trusted originating thread or a non-trusted originating thread. In this manner, a decision to take or to forego action against the trusted originating process is made.

Generally, the originating thread is determined to be a trusted originating thread if the originating thread is an original or authorized component of the trusted originating process, i.e., not injected or otherwise insinuated by invading the trusted originating process.

In one embodiment, for example, the originating thread is determined to be an original component of the trusted originating process by examining a start address in memory for the originating thread. If the start address in memory of the originating thread belongs to the process address space of the trusted originating process, the originating thread is determined to be a trusted originating thread.

The originating thread is determined to be a non-trusted originating thread if the originating thread is found to have been injected or otherwise assessed not to be an original or authorized part of the trusted originating process.

To continue with the foregoing illustration, malicious code launches a watchdog in the form of a thread injected into the trusted originating process. The injected thread issues the recreation request for recreation of Maliciousfile. After identifying the originating process of the recreation request, and making a determination that the originating process is a trusted originating process, the originating thread of the recreation request is identified. An examination of the start address in memory of the originating thread reveals that the start address does not belong to the trusted originating process address space in memory, thus the originating thread is determined to be a non-trusted originating thread, i.e., a watchdog.

If the originating thread is determined to be non-trusted, i.e., a non-trusted originating thread, flow moves from ORIGINATING THREAD TRUSTED CHECK OPERATION 228 to optional KNOWN FALSE POSITIVE CHECK OPERATION 222. In KNOWN FALSE POSITIVE CHECK OPERATION 222, a determination is made whether the non-trusted originating thread is a known false positive module, previously described. Determination is made in a manner similar to that previously described with respect to KNOWN FALSE POSITIVE CHECK OPERATION 222.

For example, in one embodiment, the non-trusted originating thread is compared to a list of known false positive modules. A match exists in the list, and the non-trusting originating thread is determined to be a known false positive module.

If the non-trusted originating thread is determined to be a known false positive module in KNOWN FALSE POSITIVE CHECK OPERATION 222, flow moves from KNOWN FALSE POSITIVE CHECK OPERATION 222 to optional ENABLE RESOURCE RECREATION OPERATION 230, previously described, and exits in EXIT OPERATION 212.

If the non-trusted originating thread is determined not to be a known false positive module in the KNOWN FALSE POSITIVE CHECK OPERATION 222, flow moves to TAKE PROTECTIVE ACTION OPERATION 224.

As previously discussed, various actions or combinations of actions are taken in the TAKE PROTECTIVE ACTION OPERATION 224 to protect the system from malicious code. For example, alternate protective actions are taken in the forms of protective action processes 400 and 500, as discussed in conjunction with FIGS. 4 and 5, respectively.

With respect to FIG. 4, a flow diagram of another example of a protective action, i.e., protective action process 400, of TAKE PROTECTIVE ACTION OPERATION 224 of FIG. 2 in accordance with one embodiment of the present invention, is shown.

After entering protective action process 400 via an ENTER OPERATION 402, flow moves to an ENABLE RESOURCE RECREATION OPERATION 404. In ENABLE RESOURCE RECREATION OPERATION 404, the stalled recreation request is allowed to proceed. More particularly, the recreation request is passed to the operating system.

By recreating the requested resource, the originating process has no further need to ensure successful recreation of the requested resource by, for example, repeatedly issuing recreation requests. This permits investigation and/or further actions without having to process additional intercepted recreation requests, as previously described.

More particularly, if a defined period of time passes in which either (1) no return code is generated for the recreation request; or (2) a return code indicating failure, sometimes called a "failure code", is generated for the recreation request, the originating process is likely to issue further recreation requests to the creation function in an attempt to recreate the requested resource.

On the other hand, if the requested resource is created, the recreation process generates a return code indicating success, sometimes called a "success code" to the originating process. Receipt of the success code typically indicates to the originating process that no need exists to issue additional recreation requests.

To illustrate, malicious code removal application 115A releases the stalled recreation request to the operating system, which creates the requested resources, MaliciousFile and MaliciousProcess.

From ENABLE RESOURCE RECREATION OPERATION 404, flow moves to a TERMINATE ORIGINATING THREAD OPERATION 406. In TERMINATE ORIGINATING THREAD OPERATION 406, the non-trusted originating thread is terminated. In this manner, the non-trusted originating thread is defeated while permitting the trusted originating process to continue without termination.

For example, in one embodiment, the non-trusted originating thread is the watchdog. The watchdog is terminated. In another embodiment, the originating process containing the watchdog is terminated.

From TERMINATE ORIGINATING THREAD OPERATION 406, flow moves to a REMOVE MALICIOUS CODE OPERATION 408. In REMOVE MALICIOUS CODE OPERATION 408, malicious code is removed.

To continue the foregoing illustration, security application 115B is invoked, which removes the recreated MaliciousFile and terminates the recreated MaliciousProcess.

From REMOVE MALICIOUS CODE OPERATION 408, flow exits in an EXIT OPERATION 410, and flow returns to malicious code removal process 200, where flow exits in EXIT OPERATION 212 or flow moves to ATTEMPT TO RECREATE RESOURCE CHECK OPERATION 210.

With respect to FIG. 5, a flow diagram of yet another example of a protective action, i.e., protective action process 500, of TAKE PROTECTIVE ACTION OPERATION 224 of FIG. 2 in accordance with one embodiment of the present invention, is shown.

After entering protective action process 500 via an ENTER OPERATION 502, flow moves to an optional RETURN IMPOSTER SUCCESS CODE OPERATION 504. In RETURN IMPOSTER SUCCESS CODE OPERATION 504, an imposter success code is returned to the originating process. The originating process equates the imposter success code with successful recreation of the requested resource, and foregoes further attempts to recreate the malicious process resource. In this manner, further recreation requests are obviated, and investigation and/or action may be taken without having to process additional intercepted recreation requests.

An imposter success code is a return code or other indicator that indicates successful execution of a called function when, in fact, the function has not completed execution or has not successfully completed execution.

To continue with the foregoing illustration, an imposter success code is returned to the originating process, indicating successful recreation of the requested resource Malicious- File, when, in fact, the recreation request remains stalled and the requested resource has not been recreated. The originating process receives the imposter success code and assumes that MaliciousFile has been recreated.

From RETURN IMPOSTER SUCCESS CODE OPERATION 504 (or from ENTER OPERATION 502), flow moves to TERMINATE/STALL ORIGINATING THREAD OPERATION 506. In TERMINATE/STALL ORIGINATING THREAD OPERATION 506, the non-trusted originating thread is terminated or stalled, i.e., one or more of the requests of the non-trusted originating thread is prevented from reaching the operating system. In this manner, if the non-trusted originating thread is the watchdog, the watchdog is defeated or activities of the watchdog are curtailed, while permitting the trusted originating process to continue without termination.

For example, in one embodiment, the non-trusted originating thread is the watchdog. The watchdog is terminated. In another embodiment, the originating process containing the watchdog is terminated.

In still another embodiment, and to continue with the foregoing illustration, the watchdog is capable of issuing recreation requests, e.g., requests for recreation or restoration of terminated processes. The watchdog is stalled, inhibiting issuance of further recreation requests, e.g., requests for restoration of MaliciousProcess.

From TERMINATE/STALL ORIGINATING THREAD OPERATION 506, flow moves to a GATHER INFORMATION OPERATION 508. In GATHER INFORMATION OPERATION 508, information is gathered to further investigate the likelihood that the trusted originating process, the non-trusted originating thread, or other system components are actually malicious code components. In this manner, further action may be taken or foregone, based on the gathered information and implications, if any.

For example, if the trusted originating process has survived several security sweeps, i.e., has been subjected to examination by security application 115B and has not been terminated by security application 115B as a result of the examination, the originating process is likely to be a non-malicious process and not a malicious code component.

From GATHER INFORMATION OPERATION 508, flow moves to an optional TAKE DEFINED ACTION OPERATION 510. In TAKE DEFINED ACTION OPERATION 510, one or more actions are taken based on the results of the GATHER INFORMATION OPERATION 508. The actions, for example, are selected to optimize malicious code identification and elimination while minimizing disruption or removal of valid, i.e., non-malicious code, computer system components. In this manner, protection of the computer system from the effects of malicious code is enhanced while maintaining the integrity of the computer system and computer system operations.

For example, the defined actions include one or a combination of the following: (1) permitting the recreation request to continue and create the resource; (2) invoking security application 115B; (3) permitting the recreation request to fail; (4) providing notification to a user or log; and (5) permitting selective action by the user or by software. The action is based on various criteria.

Permitting recreation of the resource, as previously described, reduces or eliminates issuance, and the associated processing of, additional recreation requests.

Invoking security application 115B, as previously described, permits removal of malicious code components.

Permitting the recreation request to fail, e.g., timing out due to the length of time the recreation process has been stalled, prevents the requested resource from being recreated.

Providing notification to a user or log serves to apprise the user or system administrator of ongoing activity related to malicious code, which assists in decisions about the malicious code, the computer system, or both.

Permitting selective action by the user or an application based on various criteria, i.e., the gathered information, gives the user and/or the software the capacity to determine which actions should be taken, if any, and therefore which consequences to expect.

To illustrate, after receiving notification that the user application may be infected with a virus, i.e., the non-trusted originating thread, the user chooses to end the application and to run security application 115B on host computer system 104. Alternatively, the user chooses to permit the user application to execute, and runs the security application 115B after completing work associated with the user application.

From TAKE DEFINED ACTION OPERATION 510 (or from GATHER INFORMATION OPERATION 508), flow exits in EXIT OPERATION 512.

After exiting protective action process 500, flow returns to malicious code removal process 200 and exits in an EXIT OPERATION 212 or moves to ATTEMPT TO RECREATE RESOURCE CHECK OPERATION 210.

With reference to FIG. 2, if a determination is made that the originating thread is a trusted originating thread in ORIGINATING THREAD TRUSTED CHECK OPERATION 228, flow moves to optional ENABLE RESOURCE RECREATION OPERATION 230, where the stalled recreation request is allowed to proceed, as previously described.

From ENABLE RESOURCE RECREATION OPERATION 230, malicious code removal process 200 exits in EXIT OPERATION 212 or flow moves to ATTEMPT TO RECREATE RESOURCE CHECK OPERATION 210.

Although malicious code removal application 115A is referred to as an application, this is illustrative only. Malicious code removal application 115A should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 1, this medium belongs to the computer system itself. However, the medium is also removed from the computer system. For example, malicious code removal application 115A is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 104 and/or server system 130 is a portable computer, a workstation, a two-way pager, a cellular telephone, a digital wireless telephone, a personal digital assistant, a server computer, an Internet appliance, or any other device that includes components that execute malicious code removal functionality in accordance with at least one of the embodiments as described herein. Similarly, in another embodiment, host computer system 104 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, malicious code removal functionality in accordance with one embodiment of the present invention can be implemented in a wide variety of computer system configurations. In addition, malicious code removal application 115A could be stored as different modules in memories of different devices. For example, malicious code removal application 115A could initially be stored in server system 130, and as necessary, a portion of malicious code removal application 115A could be transferred to host computer system 104 and executed on host computer system 104. Consequently, part of the removal functionality would be executed on processor 134 of server system 130, and another part would be executed on processor 108 of host computer system 104. In view of this disclosure, those of skill in the art can implement various embodiments of the present invention in a wide-variety of physical hardware configurations using an operating system and computer programming language of interest to the user.

In yet another embodiment, malicious code removal application 115A is stored in memory 136 of server system 130. Malicious code removal application 115A is transferred over network 110 to memory 114 in host computer system 104. In this embodiment, network interface 138 and I/O interface 109 would include analog modems, digital modems, or a network interface card. If modems are used, network 110 includes a communications network, and malicious code removal application 115A is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
  executing, on a processor, a malicious code removal application, wherein said executing includes:
    hooking a creation function to permit interception of a recreation request;
    determining if an attempt to recreate a new instance of a requested resource via the recreation request made by an originating process,
      wherein said determining is performed prior to execution of the recreation request; and
      wherein were the recreation request executed, said recreation request would create the new instance of said requested resource whether or not said requested resource presently exists or previously existed;
    upon determining that said attempt to recreate a requested resource via a recreation request was made, determining if said requested resource is a suspicious resource;
    upon determining that said requested resource is said suspicious resource, stalling said recreation request;
    identifying, following the stalling, the originating process of said recreation request;
    upon identifying said originating process of said recreation request, determining if said originating process is a non-trusted originating process or a trusted originating process;
    upon determining that said originating process is said non-trusted originating process, determining if said non-trusted originating process is a known false positive module;
    upon a determination that said non-trusted originating process is not the known false positive module taking a protective action; and
    upon a determination that said non-trusted originating process is said known false positive module, taking no protective action.

2. The computer-implemented method of claim 1, further comprising:
  upon determining that said originating process is a trusted originating process, identifying an originating thread of said recreation request;
  upon identifying said originating thread of said recreation request, determining if said originating thread is a non-trusted originating thread or a trusted originating thread; and
  upon determining that said originating thread is said non-trusted originating thread, taking said protective action.

3. The computer-implemented method of claim 1, further comprising:
  establishing communication with a security process to generate information about malicious code removal, said generated information used for said determining if an attempt to recreate a requested resource via a recreation request is made.

4. The computer-implemented method of claim 1, wherein said protective action comprises:
  terminating said non-trusted originating process.

5. The computer-implemented method of claim 2, wherein if said originating thread is determined to be said non-trusted originating thread, said protective action comprises:
  terminating said non-trusted originating thread.

6. The computer-implemented method of claim 5, wherein said protective action further comprises:
  removing malicious code.

7. The computer-implemented method of claim 2, wherein if said originating thread is determined to be said non-trusted originating thread, said protective action comprises:
  stalling said non-trusted originating thread.

8. A computer-implemented method comprising:
  executing, on a processor, a malicious code removal application, wherein said executing includes:
    establishing communication with a security process to provide information about malicious code removal;
    hooking a creation function to permit interception of a recreation request;
    determining if an attempt to recreate a new instance of a requested resource via said recreation request made by an originating process,
      wherein said determining is performed prior to execution of the recreation request; and wherein were the recreation request executed, said recreation request would create the new instance of said requested resource whether or not said requested resource presently exists or previously existed;

upon determining that said attempt to recreate a requested resource is made, determining if said requested resource is a suspicious resource;

upon determining that said requested resource is said suspicious resource, stalling said recreation request;

identifying, following the stalling, the originating process of said recreation request;

determining if said originating process is a non-trusted originating process or a trusted originating process;

upon determining that said originating process is said non-trusted originating process, determining if said non-trusted originating process is a known false positive module;

upon determining that said non-trusted originating process is not said known false positive module, taking a protective action;

upon determining that said originating process is said trusted originating process, identifying an originating thread of said trusted originating process, said originating thread associated with said attempt to recreate a requested resource;

determining if said originating thread of said trusted originating process is a non-trusted originating thread or a trusted originating thread;

upon determining that said originating thread is said non-trusted originating thread, determining if said non-trusted originating thread is said known false positive module; and upon determining that said non-trusted originating thread is not said known false positive module, taking said protective action.

9. The computer-implemented method of claim 8, further comprising:

upon determining that said originating thread is said trusted originating thread, enabling recreation of said requested resource.

10. The computer-implemented method of claim 8, whereupon determining that said originating process is said non-trusted originating process, said protective action comprises:

removing malicious code; and
terminating said non-trusted originating process.

11. The computer-implemented method of claim 8, whereupon determining that said originating thread is said non-trusted originating thread, said protective action comprises:

enabling recreation of said new instance of said requested resource;
terminating said non-trusted originating thread; and
removing malicious code.

12. The computer-implemented method of claim 8, whereupon determining that said originating thread is said non-trusted originating thread, said protective action comprises:

terminating said non-trusted originating thread; and
gathering information.

13. The computer-implemented method of claim 12, further comprising:

returning an imposter success code to said non-trusted originating thread.

14. The computer-implemented method of claim 12, further comprising:

taking a defined action based on information gathered in said gathering information.

15. The computer-implemented method of claim 14, wherein said defined action comprises at least one of:

permitting creation of said requested resource;
invoking security code;
permitting said attempt to recreate a requested resource to fail;
providing notification to a user;
providing notification to a log; and
permitting a selective action.

16. A computer-program product comprising a computer readable medium containing computer program code comprising:

a malicious code removal application for hooking a creation function to permit interception of a recreation request;

a malicious code removal application for determining that an attempt to recreate a new instance of a requested resource via the recreation request made by an originating process, wherein said determining is performed prior to execution of the recreation request; and wherein were the recreation request executed, said recreation request would create the new instance of said requested resource whether or not said requested resource presently exists or previously existed;

said malicious code removal application further for determining that said requested resource is a suspicious resource, upon determining said attempt to recreate a requested resource via a recreation request is made;

said malicious code removal application further for stalling said recreation request, upon determining said requested resource is said suspicious resource;

said malicious code removal application further for identifying the originating process of said recreation request following the stalling said malicious code removal application further for determining that said originating process is a non-trusted originating process or a trusted originating process, upon said identifying the originating process;

said malicious code removal application further for determining if said non-trusted originating process is a known false positive module, upon determining that said originating process is said non-trusted originating process;

said malicious code removal application further for taking a protective action upon determining said non-trusted originating process is not the known false positive module; and said malicious code removal application further taking no protective action upon a determination that said non-trusted originating process is said known false positive module.

17. The computer-program product of claim 16, wherein:
said malicious code removal application further for identifying an originating thread of said originating process, upon determining said originating process is said trusted originating process;

said malicious code removal application further for determining that said originating thread is a non-trusted originating thread or a trusted originating thread, upon said identifying an originating thread; and said malicious code removal application further for taking said protective action upon determining said originating thread is said non-trusted originating thread.

* * * * *